United States Patent [19]

Baldwin

[11] 4,091,769
[45] May 30, 1978

[54] NON-AIR BREATHING OPTION FOR AN INTERNAL COMBUSTION ENGINE

[76] Inventor: Richard J. Baldwin, 31 Sagamore Trail, Sparta, N.J. 07871

[21] Appl. No.: 771,878

[22] Filed: Feb. 25, 1977

[51] Int. Cl.² ............................................. F02B 45/00
[52] U.S. Cl. .............................. 123/1 A; 60/39.46 M; 60/39.46 P
[58] Field of Search .................... 123/1 A, 27 GE; 60/39.46 M, 39.46 P

[56] References Cited

U.S. PATENT DOCUMENTS

| | | | |
|---|---|---|---|
| 2,574,495 | 11/1951 | Parker | 60/39.46 M |
| 2,673,069 | 3/1954 | Carpenter | 60/39.46 M X |
| 3,709,203 | 1/1973 | Cettin et al. | 123/1 A X |
| 3,965,673 | 6/1976 | Friedrich | 60/39.15 X |
| 4,011,840 | 3/1977 | Forster | 123/1 A X |

FOREIGN PATENT DOCUMENTS 971,445  7/1975  Canada .......................... 123/1 A Primary Examiner—Charles J. Myhre
Assistant Examiner—Ira S. Lazarus
Attorney, Agent, or Firm—Peter A. Taucher; John E. McRae; Nathan Edelberg

[57] ABSTRACT

An internal combustion engine having an auxiliary monopropellant fuel supply for operation where reliance on atmospheric air for support of combustion would be undesired or not feasible. The auxiliary monopropellant fuel system includes a fuel selector valve for disconnecting supply of hydrocarbon fuel, and an air cutoff valve for closing the engine cylinder air intake.

6 Claims, 1 Drawing Figure

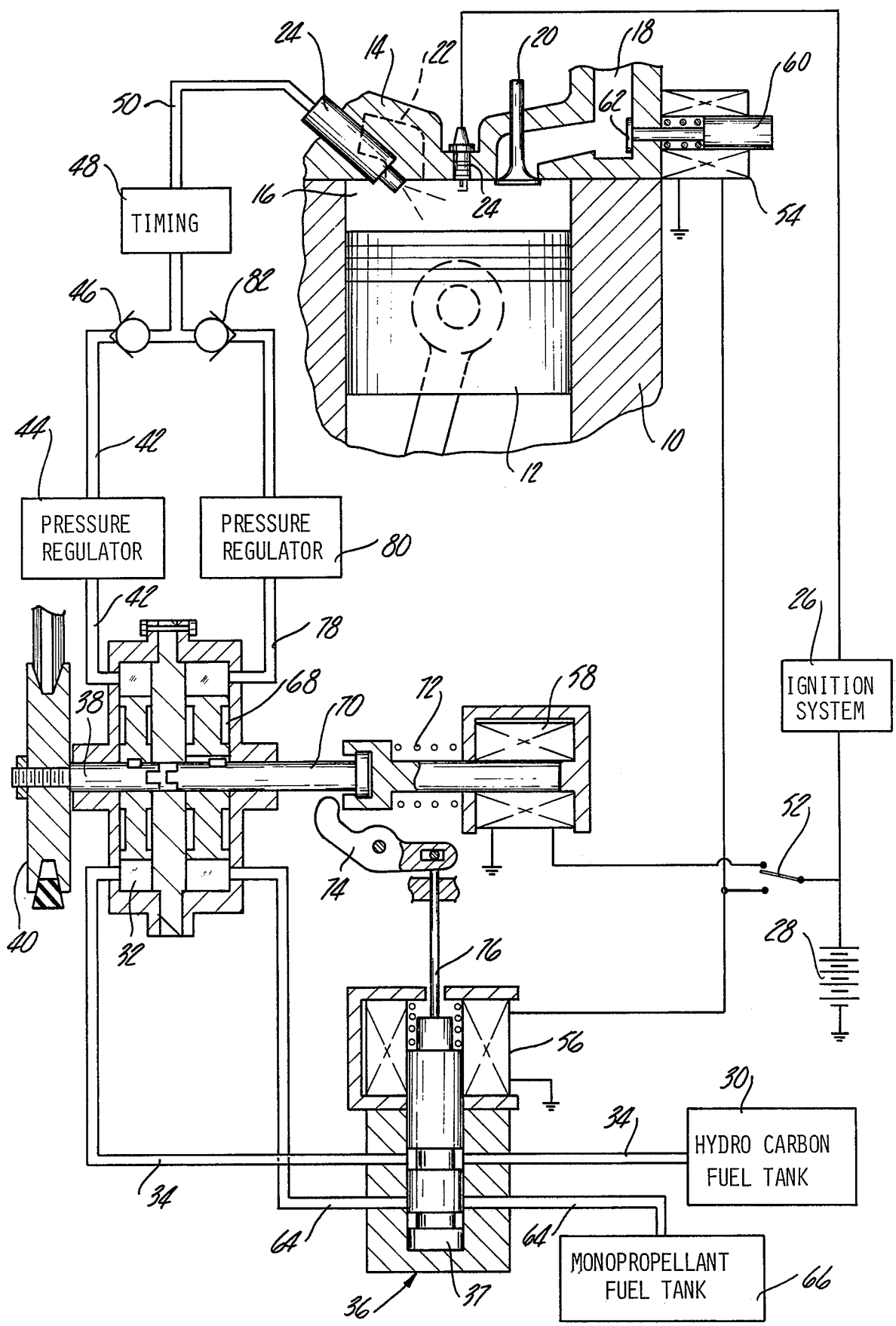

NON-AIR BREATHING OPTION FOR AN INTERNAL COMBUSTION ENGINE

BACKGROUND AND SUMMARY OF THE INVENTION

In certain situations it would be desirable for a vehicle to have its engine operate without reliance on atmospheric air for combustion purposes. For example, when a military vehicle is required to traverse rivers or streams, or where the vehicle is required to move in a swirling desert environment, it would be desirable for the engine to operate without reliance on the external atmosphere. Another situation would be upper atmosphere operation where the air is thin or nonexistent.

The present invention relates to a conventional hydrocarbon engine equipped with an auxiliary monopropellant fuel system that can be operatively substituted for the hydrocarbon fuel system by actuation of a manual switch.

The invention described herein may be manufactured, used, and licensed by or for the Government for governmental purposes without payment to me of any royalty thereon.

THE DRAWING

The single FIG. of the drawing schematically illustrates a single cylinder of an engine equipped with an auxiliary monopropellant fuel system according to this invention.

The drawing shows an engine having a single cylinder 10 for slidably mounting a piston 12 in the space below a cylinder head 14. Combustion air is supplied to the combustion space 16 through an air intake passage 18 that leads to a conventional intake valve 20 operated by an engine-driven cam (not shown) in the usual fashion. A similar cam-operated poppet valve would be provided for the exhaust passage 22. The hydrocarbon fuel is supplied or injected into the combustion chamber 16 through a conventional injector 24 that is part of a conventional fuel supply system; liquid hydrocarbon fuel is sprayed from the injector 24 into chamber 16 as the piston nears the top dead center position on the compression stroke. The fuel-air mixture is ignited by a conventional spark plug 24 that is supplied with high voltage from a conventional ignition system 26 energized by a D.C. source of voltage 28.

The gasoline or similar hydrocarbon fuel is initially taken from a fuel tank 30 by means of a rotary fuel pump 32; the pump intake is connected to tank 30 via a line 34 that is routed through a spooltype selector valve 36. The pump 32 is equipped with a shaft 38 rigidly affixed to a pulley 40 having a belt-drive connection with the engine crankshaft (not shown). The pump output line 42 leads through a pressure regulator 44 and check valve 46 to a conventional timing valve 48 driven in synchronism with the engine for delivering pressurized liquid fuel through line 50 to the injector 24. Pressure-responsive plunger means within the injector delivers a high pressure fuel spray into combustion chamber 16.

The described hydrocarbon fuel system is conventional and preferably unmodified. The invention relates to an auxiliary monopropellant fuel system that is operatively switched into being by means of the manual switch 52, said switch being connected with three solenoid operators 54, 56 and 58.

Solenoid 54 forms part of an air cutoff valve 60 arranged in the air intake for the combustion chamber. Energization of solenoid 54 causes the poppet valve element 62 to move leftwardly to close air intake passage 18.

Solenoid 56 forms part of a spool-type selector valve 36 that comprises a spool 37 having spaced grooves therein for alternately opening the hydrocarbon fuel line 34 and the monopropellant fuel line 64. When solenoid 56 is energized the spool element 37 is drawn upwardly to open line 64, thereby permitting the monopropellant to be drawn from tank 66 through line 64 to the intake port for a vane type pump 68. The monopropellant can be a conventional fuel used in rockets, such as quaternary ammonium nitrate, an example of such being Cavea "B". Pumping element 68 is keyed to slidable shaft 70 whose left end forms a tooth-like clutch element cooperable with a notch-like clutch surface formed on the end of shaft 38. Shaft 70 is moved from its illustrated disengaged position to its engaged position by a spring 72 when permitted by latch 74. Latch operation is produced by upward movement of a latch-actuator rod 76 carried by the armature of solenoid 56. Thus, enerization of solenoid 56 moves spool 37 to open line 64 and simultaneously untrip the latch 74 for enabling spring 72 to operate shaft 70 leftwardly to its engaged position operatively connected to the engine through shaft 38.

The output of pump 68 is directed through line 78, pressure regulator 80, and check valve 82, thence through the timing valve 48; check valve 46 prevents flow of monopropellant back through line 42. The operation of the engine on monopropellant fuel is somewhat similar to conventional operation using hydrocarbon fuel, since the timing valve 48 is common to both operations. However the injection quantities can be different due to different settings or adjustments for the different pressure regulators 44 and 80. Thus, the quantity of propellant injected into the cylinder 10 may be less than the quantity of hydrocarbon fuel. Also, the monopropellant operation is affected by the fact that valve 62 prevents intake of air into the combustion chamber; therefore the engine does not go through its normal intake and compression strokes, although the piston has the same movement in relation to the spark, i.e. the plug fires on every other complete cycle.

It is believed that conventional four cycle, spark-ignited engines can operate on monopropellant fuel in a continuous fashion since the spark plug 24 will produce the necessary elevated temperature for initiating each explosion; heat is also generated during the preceeding explosion in sufficient quantity to promote propellant dissociation (exothermic chemical action). It is not known how long an engine could be run on monopropellant fuel without overheating, but presumably the pressure regulator 80 could be set to provide some measure of continuous operation for at least short run emergency situations. Applicant has in mind such situations as the crossing of streams or rivers, or short time operation in desert dust storms, or intermittent operation at high altitudes. The drawing shows switch 52 in its position corresponding to normal run operation of the engine. The selector valve 36 is set to pass hydrocarbon fuel from tank 30 to pump 32; solenoid 58 is energized to draw shaft 70 rightwardly, thereby effectively disconnecting monopropellant pump 68; solenoid 54 is deenergized to permit the associated spring to move the valve element 62 to its open position.

When manual switch 52 is depressed to its nonillustrated position the solenoid 54 is energized so that valve element 62 cuts off the air flow through intake 18; solenoid 56 is energized to move spool 37 upwardly for opening line 64 and closing line 34. The solenoid also untrips latch 74, thereby permitting spring 72 to move shaft 70 to a position for operating pump 68; at this time solenoid 58 is deenergized by the open circuit at switch 52.

I wish it to be understood that I do not desire to be limited to the exact details of construction shown and described for obvious modifications will occur to a person skilled in the art.

I claim:

1. In an internal combustion engine comprising a piston-cylinder means having a valved air intake and valved combustion products exhaust; means for injecting hydrocarbon fuel into the cylinder; spark ignition means for igniting the air-fuel mixture in the cylinder; said fuel injecting means comprising a hydrocarbon fuel tank, an engine-driven fuel pump connected to said tank, a pressure-responsive injector delivering the pump output to the cylinder; and timing means for cyclically disconnecting the injector from the pump:

the improvement comprising a monopropellant fuel tank; a monopropellant pump for delivering propellant from its tank to the aforementioned timing means; a fuel selectro valve having a first normal run position wherein the hydrocarbon fuel pump communicates with the hydrocarbon fuel tank, and a second emergency position wherein the propellant pump communicates with the propellant tank; and an air cut-off valve for closing the cylinder air intake only while the selector valve is in its emergency position.

2. The improvement of claim 1: the fuel selector valve and air cut-off valve being solenoid-operated.

3. The improvement of claim 2 and further comprising a single manual switch controlling current flow through the selector valve solenoid and air cut-off valve solenoid, to thereby synchronize the respective valve operations relative to one another.

4. The improvement of claim 1 and further comprising a check valve in each pump output, whereby each pump is prevented from pumping its fuel into the other pump output.

5. The improvement of claim 1 and further comprising an electrically-operated clutch for drivingly connecting the monopropellant pump to the engine only when the fuel selector valve is in its emergency position.

6. The improvement of claim 5: said clutch comprising a power take-off shaft slidably keyed to the monopropellant pump for movement between a normal run positon disengaged from the engine and an emergency position operatively engaged with the engine; said clutch further comprising a solenoid for sliding said shaft in one direction and a spring for sliding the shaft in the other direction.

* * * * *